J. KLEIN.
SPRING SUPPORT FOR AUTOMOBILES.
APPLICATION FILED MAR. 12, 1920.

1,371,904.

Patented Mar. 15, 1921.

Inventor
John Klein

By Mason Fenwick & Lawrence,
Attorneys

UNITED STATES PATENT OFFICE.

JOHN KLEIN, OF WASHINGTON, DISTRICT OF COLUMBIA.

SPRING-SUPPORT FOR AUTOMOBILES.

1,371,904.     Specification of Letters Patent.     Patented Mar. 15, 1921.

Application filed March 12, 1920. Serial No. 365,258.

*To all whom it may concern:*

Be it known that I, JOHN KLEIN, citizen of the United States, residing at Washington, in the District of Columbia, have invented certain new and useful Improvements in Spring-Supports for Automobiles; and I do hereby declare the following to be a full, clear, and exact description of the invention, such as will enable others skilled in the art to which it appertains to make and use the same.

This invention relates to new and useful improvements in spring supports and more particularly to a spring support for automobiles; it has for its primary object to provide means for supporting an auxiliary spring to convert a chassis of a well-known type of automobile into a truck chassis.

A further object of the invention is the provision of such a spring support for the auxiliary spring as shall operate in position with the spring support ordinarily used upon such type of automobile and carry such support directly from the ordinary spring support, the regular spring remaining supported and suspended as it comes from the factory.

A further object of the invention is to provide an improved means for attaching an auxiliary spring to the support, whereby the support of such springs will equalize.

A further object of the present invention is the provision of an auxiliary spring support whereby should any of the parts thereof become broken, they can be readily removed and replaced by new ones.

With the above and other objects in view, the invention consists in the novel features and construction, the combination and arrangement of parts hereinafter more fully set forth, pointed out in the claims and shown in the accompanying drawings, in which—

Figure 1:
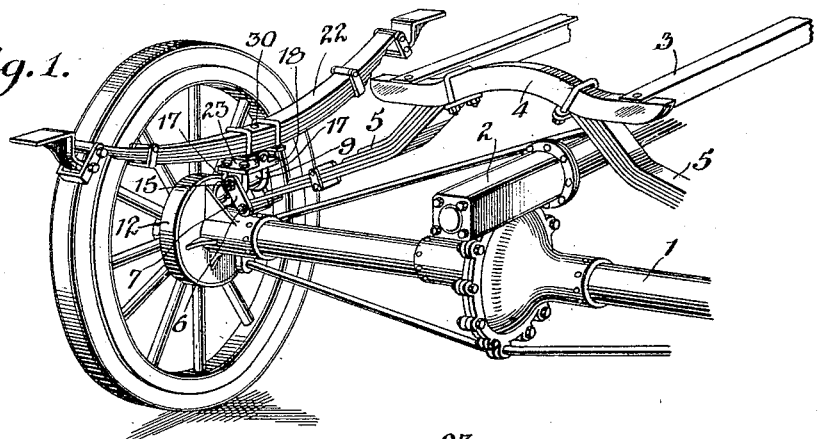
Figure 2:
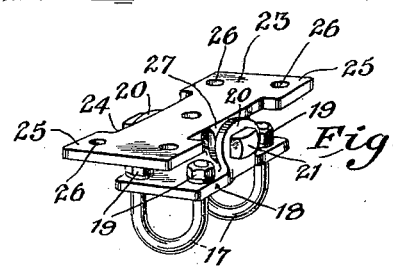
Figure 4:
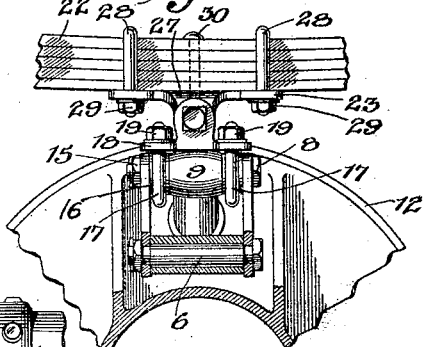
Figure 3:
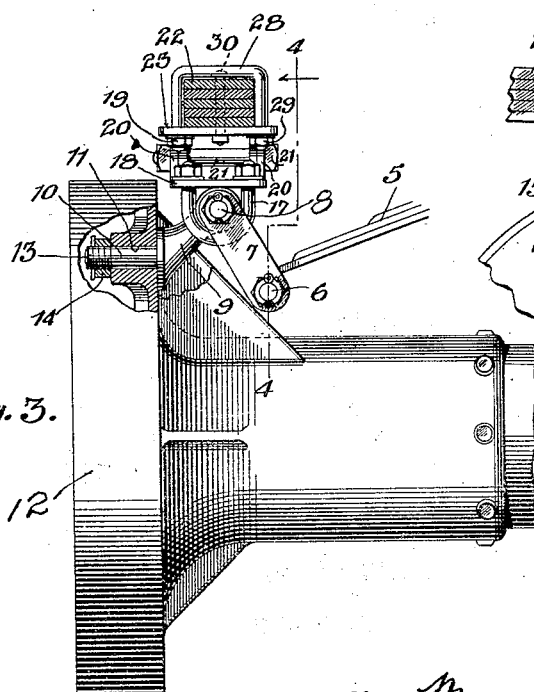

Figure 1 is a perspective view of a portion of the rear end of a chassis, illustrating my improved auxiliary spring support applied thereto, Fig. 2 is a perspective view of my improved auxiliary spring support, Fig. 3 is an end elevation showing the manner of application, and Fig. 4 is a side elevation partly in section, the section being taken on the line 4—4 of Fig. 3 and looking in the direction of the arrow.

I have illustrated my improved auxiliary spring support as attached to a popular type of automobile chassis, the chassis including the rear axle 1, the gear housings 2 and the main body of the chassis 3. The main body of the chassis carries the rear spring support 4, to which the springs 5 are attached at their inner ends. The outer ends of the springs 5 are loosely connected to a transverse pivot bolt 6, arranged within the outer or lower ends of the links 7. These links 7 are supported for pivotal movement upon the ends of a pivot bolt 8 extending through the transverse portion of the perch 9.

The perch 9 is in general use upon a particular and popular type of automobile for supporting the outer ends of the automobile springs 5. This perch in its construction comprises a T-shaped body having a shank 10 adapted to extend through a perforated enlargement 11 of the brake housing 12 and is threaded upon its inner end as shown at 13, whereby a nut 14 can be readily attached thereto to securely mount the perch 9 upon the brake housing. As stated heretofore, the pivot bolt 8 extends through the transverse outer end of the perch 9 and is provided with a nut 15 to securely retain the same in position as the ends of the link 7 have been mounted for pivotal movement upon this bolt 8.

The ends of the transverse portion of the perch 9 are materially reduced and mounted thereon are suitable collars 16 which tend to bring the reduced portions up to a size to correspond with the ends of the central part of the transverse portion of the perch, as will be noted in Fig. 4.

My improved auxiliary spring support which is illustrated in perspective in Fig. 2 is mounted upon the ends of this perch 9 and supported in position by means of the U-bolts 17. These U-bolts 17 are adapted to embrace the ends of the perch 9 and the ends thereof extend upwardly through suitable openings formed in the bearing plate 18 adjacent each end thereof. Nuts 19 are then threaded upon the upper ends of the bolts 17 to rigidly retain the bearing plate in position upon the upper face of the perch 9.

This bearing plate 18 is preferably rectangular in form and provided upon its longitudinal edges with upstanding, perforated ears 20 arranged approximately at the central portion of the plate and disposed at right angles thereto to receive a pivot bolt 21. For mounting the auxiliary spring 22, I provide what will be known as cradle, which includes a plate 23 having recessed portions 24 which form the extensions 25 projecting outwardly from the longitudinal edges of the plate at each end thereof and which are provided with suitable openings 26. The plate 23 is also provided with perforated ears 27 formed upon the longitudinal edges of the recessed portions 24, midway between the extensions 25 and are to extend at right angles to the plate and to be arranged for abutting the inner faces of the ears 20 so that when the pivot bolt 21 is passed through the ears 20 and 27, it will provide rocking support for the cradle.

The auxiliary spring which is indicated by the numeral 22 is mounted upon the plate 23 and rigidly retained in position by means of the U-bolts 28 adapted to embrace the spring 22 and have their ends inserted through the openings 26 in the plate and then provided with nuts 29 threaded upon the ends of the bolts 28 to securely retain the spring 22 in position upon the plate 23.

In the construction described above it will be readily apparent that should one of the parts of my improved auxiliary spring support become broken, they can be readily replaced by new parts and it will also be apparent that the support itself can be quickly and readily attached to a particular and popular type of automobile so that the chassis of the same may be readily converted into a truck chassis by the attachment of this auxiliary spring 22. In applying my improved spring support, there will be no material changes in the regular construction of the chassis as it is received from the factory, it being the main object of my invention to provide an auxiliary support for the well-known type of chassis to convert the same into a truck chassis.

In order to retain the auxiliary spring 22 against any longitudinal movement with respect to the cradle, a bolt 30 is extended through the spring at approximately the central portion thereof and through the center of the spring plate 23. A suitable nut or other fastening member is attached to the lower end of this bolt to securely hold it in position so as to retain the spring 22 against any longitudinal movement.

What I claim is:

1. The combination, with an automobile chassis having a spring support, of a bearing plate mounted upon the spring support and provided with upturned perforated ears, a spring supporting plate having perforated ears disposed in alinement with the ears on the bearing plate, a pivot pin extending through said ears to provide a pivot for the spring supporting plate, and an auxiliary spring carried by the supporting plate.

2. The combination, with an automobile chassis having a spring support, of a bearing plate mounted upon the spring support, U-bolts adapted to embrace the spring support and having their ends connected with the bearing plate, an auxiliary spring support mounted for rocking movement upon the bearing plate, and an auxiliary spring carried by the auxiliary spring support.

3. The combination, with an automobile chassis having a spring support, of a bearing plate mounted upon this spring support, U-bolts adapted to embrace the spring support and having their ends connected with the bearing plate to retain said plate in position upon the support, perforated ears extending upwardly from the bearing plate, a spring supporting plate arranged above the bearing plate and having perforated ears disposed in alinement with the ears on the bearing plate, a pivot bolt extending through said ears to provide a pivot for the spring supporting plate, an dan auxiliary spring mounted upon the spring supporting plate.

4. The combination, with a brake housing having a spring support carried thereby, of an auxiliary spring support mounted upon the spring support, a cradle pivoted upon the auxiliary spring support, and an auxiliary spring carried by the cradle.

5. The combination, with a brake housing having a T-shaped perch carried thereby, of a bearing plate secured to the transverse portion of the perch, a cradle pivoted upon the bearing plate, and an auxiliary spring carried by the cradle.

6. The combination of a brake housing having a T-shaped perch carried thereby, of a bearing plate mounted upon the transverse portion, U-bolts adapted to embrace the perch and have their ends connected by the bearing plate, a cradle pivoted upon the bearing plate, and an auxiliary spring carried by the cradle.

7. A device of the class described, including a T-shaped perch, means for supporting said perch, a bearing plate secured to the transverse portion of the perch, a cradle pivoted upon the bearing plate and an auxiliary spring carried by the cradle.

8. A device of the class described, including a T-shaped perch, a bearing plate mounted upon the transverse portion, U-bolts adapted to embrace the perch and have their ends connected by the bearing plate, a cradle pivoted upon the bearing plate and an auxiliary spring carried by the cradle.

In testimony whereof I affix my signature.

JOHN KLEIN.